US012810883B2

(12) United States Patent
Sharma et al.

(10) Patent No.: US 12,810,883 B2
(45) Date of Patent: Nov. 24, 2026

(54) SYSTEM AND METHOD FOR DISENTANGLING AUDIO SIGNAL INFORMATION

(71) Applicant: Microsoft Technology Licensing, LLC, Redmond, WA (US)

(72) Inventors: Dushyant Sharma, Mountain View, CA (US); Patrick A. Naylor, Reading (GB); Sri Harsha Dumpala, Halifax (CA); Chandramouli Shama Sastry, Halifax (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 18/532,893

(22) Filed: Dec. 7, 2023

(65) Prior Publication Data

US 2025/0078851 A1 Mar. 6, 2025

Related U.S. Application Data

(60) Provisional application No. 63/580,629, filed on Sep. 5, 2023.

(51) Int. Cl.
*G10L 21/02* (2013.01)

(52) U.S. Cl.
CPC .................................... *G10L 21/02* (2013.01)

(58) Field of Classification Search
CPC ........................................................ G10L 21/02
See application file for complete search history.

(56) References Cited

U.S. PATENT DOCUMENTS

| | | | | |
|---|---|---|---|---|
| 6,336,092 | B1 | 1/2002 | Gibson et al. | |
| 10,971,142 | B2 | 4/2021 | Sriram | |
| 11,562,744 | B1 | 1/2023 | Gao | |
| 12,243,511 | B1 * | 3/2025 | Joly | G10L 13/033 |
| 2015/0067869 | A1 | 3/2015 | Krieger | |
| 2019/0051290 | A1 | 2/2019 | Li | |

(Continued)

OTHER PUBLICATIONS

"Gram-Schmidt process", Retrieved from: https://en.wikipedia.org/wiki/Gram%E2%80%93Schmidt_process, Aug. 7, 2023, 9 Pages.

(Continued)

*Primary Examiner* — Bryan S Blankenagel
(74) *Attorney, Agent, or Firm* — Foley IP Law, PLLC

(57) ABSTRACT

A method, computer program product, and computing system for disentangling background information from speaker information in a speech signal. Background information is extracted from the speech signal to generate a background acoustics embedding and speaker information is extracted from the speech signal to generate a speaker acoustics embedding. A first loss factor is applied to the background acoustics embedding to decrease speaker information therein to generate a processed background acoustics embedding using machine learning and a second loss factor is applied to the speaker acoustics embedding to decrease background information therein to generate a processed speaker acoustics embedding using machine learning. At least one of the processed background acoustics embedding and the processed speaker acoustics embedding is output to a speech processing system.

20 Claims, 7 Drawing Sheets

(56) References Cited

U.S. PATENT DOCUMENTS

| | | | |
|---|---|---|---|
| 2019/0287515 | A1 | 9/2019 | Li et al. |
| 2019/0311721 | A1* | 10/2019 | Edwards ................. G10L 17/06 |
| 2019/0355366 | A1 | 11/2019 | Ng |
| 2019/0378006 | A1 | 12/2019 | Fukuda et al. |
| 2020/0334538 | A1 | 10/2020 | Meng et al. |
| 2020/0357384 | A1 | 11/2020 | Kim |
| 2020/0365166 | A1 | 11/2020 | Zhang |
| 2021/0304628 | A1* | 9/2021 | Chen ........................ G06N 3/09 |
| 2021/0335337 | A1 | 10/2021 | Gkoulalas-Divanis |
| 2021/0343305 | A1* | 11/2021 | Jin .......................... G10L 21/02 |
| 2022/0012637 | A1 | 1/2022 | Rezazadegan Tavakoli |
| 2022/0157316 | A1 | 5/2022 | Rebryk |
| 2022/0206130 | A1* | 6/2022 | Li ....................... G01S 7/52077 |
| 2022/0262357 | A1 | 8/2022 | Naylor et al. |
| 2022/0277064 | A1 | 9/2022 | Streit |
| 2023/0100259 | A1 | 3/2023 | Wang |
| 2023/0112622 | A1 | 4/2023 | Jun |
| 2023/0267372 | A1 | 8/2023 | Sujith |
| 2023/0267936 | A1 | 8/2023 | Vair |
| 2023/0368778 | A1* | 11/2023 | Olabiyi ................. G06F 40/216 |
| 2023/0386456 | A1 | 11/2023 | Weston |
| 2023/0410789 | A1 | 12/2023 | Sharma |
| 2024/0005908 | A1* | 1/2024 | Sharma ................... G10L 15/02 |
| 2024/0031765 | A1* | 1/2024 | Munoz .................... H04S 7/303 |
| 2024/0161728 | A1 | 5/2024 | Ghosh |
| 2024/0185829 | A1* | 6/2024 | Wang ...................... G10L 13/02 |
| 2024/0221767 | A1 | 7/2024 | Chae |
| 2024/0289491 | A1 | 8/2024 | Zhang |
| 2025/0118285 | A1* | 4/2025 | Bansal .................... G10L 13/10 |
| 2025/0148078 | A1 | 5/2025 | Lal |
| 2025/0157477 | A1 | 5/2025 | Gaznepoglu |
| 2025/0191597 | A1 | 6/2025 | Sharma |
| 2025/0191599 | A1 | 6/2025 | Sharma |
| 2025/0292776 | A1* | 9/2025 | Chang .................... G06N 3/045 |
| 2025/0315631 | A1 | 10/2025 | Waibel |

OTHER PUBLICATIONS

Chan, et al., "SpeechSplit 2.0: Unsupervised speech disentanglement for voice conversion Without tuning autoencoder Bottlenecks", In Repository of arXiv:2203.14156v1, Mar. 26, 2022, 5 Pages.

Chen, et al., "WavLM: Large-Scale Self-Supervised Pre-Training for Full Stack Speech Processing", In Repository of arXiv:2110.13900v5, Jun. 17, 2022, pp. 1-14.

Défossez, et al., "High Fidelity Neural Audio Compression", In Repository of arXiv:2210.13438v1, Oct. 24, 2022, 19 Pages.

Desplanques, et al., "Ecapa-tdnn: Emphasized channel attention, propagation and aggregation in tdnn based speaker verification", In Repository of arXiv:2210.13438v1, Oct. 24, 2022, 5 Pages.

Huang, et al., "SPIRAL: Self-supervised perturbation-invariant representation learning for speech pre-training", In Repository of arXiv:2201.10207v3, Mar. 6, 2022, 15 Pages.

Kang, et al., "Disentangled speaker and nuisance attribute embedding for robust speaker verification", In Journal of IEEE Access, vol. 8, Jul. 31, 2020, pp. 141838-141849.

Kim, et al., "Advancing the Dimensionality Reduction of Speaker Embeddings for Speaker Diarisation: Disentangling Noise and Informing Speech Activity", In Repository of arXiv:2110.03380v3, Nov. 3, 2022, 5 Pages.

Kumar, et al., "Torchaudio-Squim: Reference-Less Speech Quality and Intelligibility Measures in Torchaudio", In Repository of arXiv:2304.01448v1, Apr. 4, 2023, 5 Pages.

Li, et al., "Non-Intrusive Signal Analysis for Room Adaptation of ASR Models", In Proceedings of 30th European Signal Processing Conference, Aug. 29, 2022, pp. 130-134.

Madras, et al., "Learning Adversarially Fair and Transferable Representations", In Repository of arXiv: 1802.06309v3, Oct. 22, 2018, 11 Pages.

Omran, et al., "Disentangling speech from surroundings with neural embeddings", In Repository of arXiv:2203.15578v2, Jun. 4, 2023, 5 Pages.

Peri, et al., "An empirical analysis of information encoded in disentangled neural speaker representations", In Repository of arXiv:2002.03520v2, Apr. 8, 2020, 8 Pages.

Tzeng, "Simultaneous Deep Transfer Across Domains and Tasks", In Repository of arXiv: 1510.02192v1, Oct. 8, 2015, pp. 1-9.

Yi, et al., "Disentangled Speaker Embedding for Robust Speaker Verification", In Proceedings of IEEE International Conference on Acoustics, Speech and Signal Processing, May 2022, 5 Pages.

International Search Report and Written Opinion received for PCT Application No. PCT/US2024/041148, Oct. 9, 2024, 18 pages.

Tai, et al., "SEEF-ALDR: A Speaker Embedding Enhancement Framework via Adversarial Learning based Disentangled Representation", 2020 2nd Symposium on Signal Processing Systems, ACMPUB27, New York, NY, USA, Dec. 7, 2020, pp. 939-950.

Fang, et al., "Speaker Anonymization Using X-vector and Neural Waveform Models", arXiv:1905.13561v1, May 30, 2019, 06 pages.

Final Office Action mailed on Dec. 29, 2025, in U.S. Appl. No. 18/532,871, 24 Pages.

Final Rejection mailed on Aug. 27, 2026, in U.S. Appl. No. 18/532,871, 20 Pages.

Hu, et al., "SpeechHide: A Hybrid Privacy-preserving Mechanism for Speech Content and Voiceprint in Speech Data Sharing", 7th IEEE International Conference on Data Science in Cyberspace (DSC), Jul. 2022, pp. 345-342.

Kennedy, et al., "I Can Hear Your Alexa: Voice Command Fingerprinting on Smart Home Speakers", IEEE Conference on Communications and Network Security (CNS), Jun. 2019, pp. 232-240.

Luo, et al., "Encrypted Semantic Communication Using Adversarial Training for Privacy Preserving" IEEE Communications Letters, vol. 27, Issue 6, Apr. 24, 2023, pp. 1486-1490.

Non-Final Office Action mailed on Aug. 11, 2025, in U.S. Appl. No. 18/532,900, 18 pages.

Non-Final Office Action mailed on Jul. 22, 2025, in U.S. Appl. No. 18/532,871 24 Pages.

Non-Final Rejection mailed on Mar. 24, 2026, in U.S. Appl. No. 18/532,871, 24 pages.

Notice of Allowance mailed on Feb. 25, 2026, in U.S. Appl. No. 18/532,900, 13 pages.

Notice of Allowance mailed on Oct. 14, 2026, in U.S. Appl. No. 18/532,871 09 Pages.

* cited by examiner

SYSTEM AND METHOD FOR DISENTANGLING AUDIO SIGNAL INFORMATION

CROSS REFERENCE TO RELATED APPLICATIONS

This application claims the benefit of U.S. Provisional Patent Application Ser. No. 63/580,629 filed on Sep. 5, 2023 and entitled "System and Method for Separating Background Acoustic Information and Speaker Acoustic Information from an Audio Signal", which is hereby incorporated by reference in its entirety for all intents and purposes.

BACKGROUND

Text-to-Speech (TTS) and Voice Style Transfer (VST) systems preferably utilize high quality, clean speech in the speaking style of a target speaker by exploiting speaker embeddings and high-quality training data that is clean and without noise, reverberation or other artifacts. Data privacy can be enhanced in speech processing systems by using VST to change voice characteristics so that the speaker cannot be recognized. In applications were a text transcription is available, TTS can be used to resynthesize an audio signal with a modified transcript and voice style so that the privacy of the content of the signal and the speaker characteristics can be enhanced. However, the clean data required by such operations is time consuming and computationally expensive to collect, since it requires high-quality recordings of a large corpus by a number of speakers. A requirement of these VST and TTS operations is to produce audio with matching background acoustics, i.e., noise, reverberation, and other distortions, as production/field data. Furthermore, in the creation of audio data in VST and/or TTS operations, there may be specialized vocabulary, such as terms and acronyms specific to a particular field (medical, engineering, etc.) and voice characteristics (pronunciations, accents, etc.) that require extra effort in modelling of components in the speech synthesis process. Accordingly, training VST and TTS systems on collected field data is difficult because the dimensions of the background acoustics are very large and typically mixed in with speaker embedding information.

BRIEF DESCRIPTION OF THE DRAWINGS

Like reference symbols in the various drawings indicate like elements.

DETAILED DESCRIPTION

As will be discussed in greater detail below, implementations of the present disclosure are directed to processing audio signals such as speech signals to enhance the operation of speech processing systems such as Text-to-Speech (TTS) and Voice Style Transfer (VST) systems. In such systems, received speech signals can include various types of speech components, such as background acoustic information, which includes background noise and room reverberation, and speaker acoustic information, such as pitch and pitch variation, vocal tract length, and other factors, such as age, gender, accent, and language. Text To Speech (TTS) and Voice Style Transfer (VST) systems can be used to enhance data privacy, by (1) changing the voice characteristics (via VST) so that the speaker cannot be recognized and (2) by using TTS to re-synthesize the audio with a modified transcript and voice style.

Implementations of the disclosure disentangle the background content from the speaker related content allowing control for a TTS/VST system to independently control those dimensions of a speech signal. Moreover, since the system estimates actual parameters from each embedding, each of the embeddings captures relevant information (i.e. the speaker embedding estimates physiologically related features, such as pitch and vocal tract length), thus making these embeddings "explainable." In other words, explainable embeddings correspond to physical parameters associated with the speaker (in the case of explainable speaker embeddings) rather than standard embeddings, which are typically abstract mathematical representations of the acoustic information.

Non-Intrusive Speech Assessment (NISA) estimates a number of acoustic parameters and learns a background acoustic's embedding, by estimating and disentangling the information contained in the neural embedding, where some of the information relates to the speaker and some to the background acoustics. In an implementation, two sub-neural networks are used to estimate separately NISA/background acoustic metrics and speaker acoustic metrics. An adversarial constraint is placed on a loss function applied to each component of the signal to control the disentanglement of information between the two embeddings. A clear separation of the tasks each sub-network estimates allows for further disentanglement since the bottlenecks/embeddings in each case must to prioritize retention of information useful for estimating their respective metrics.

Figure 1:
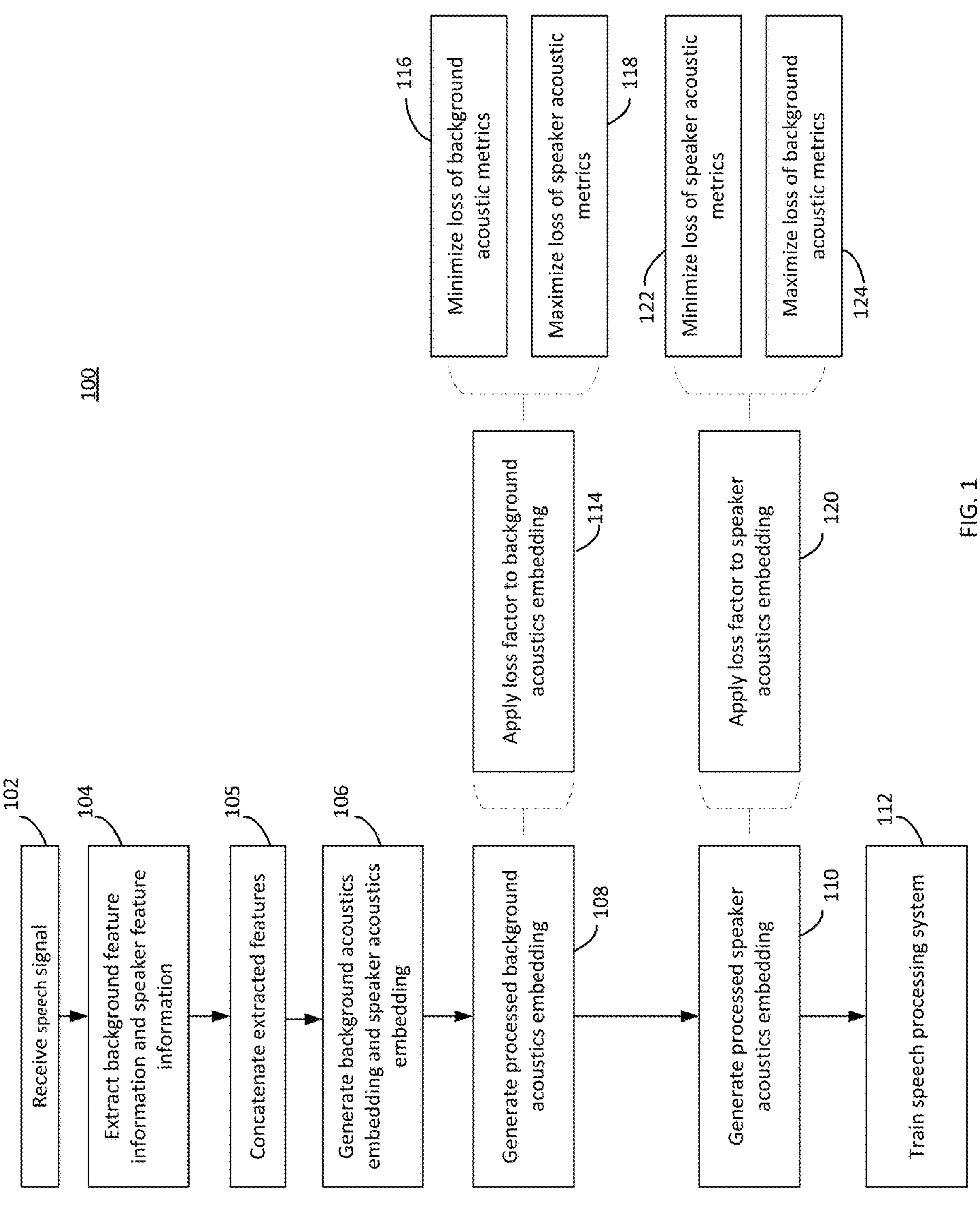
FIG. 1 is a flow chart of one implementation of a speech signal disentanglement process.
Figure 2:
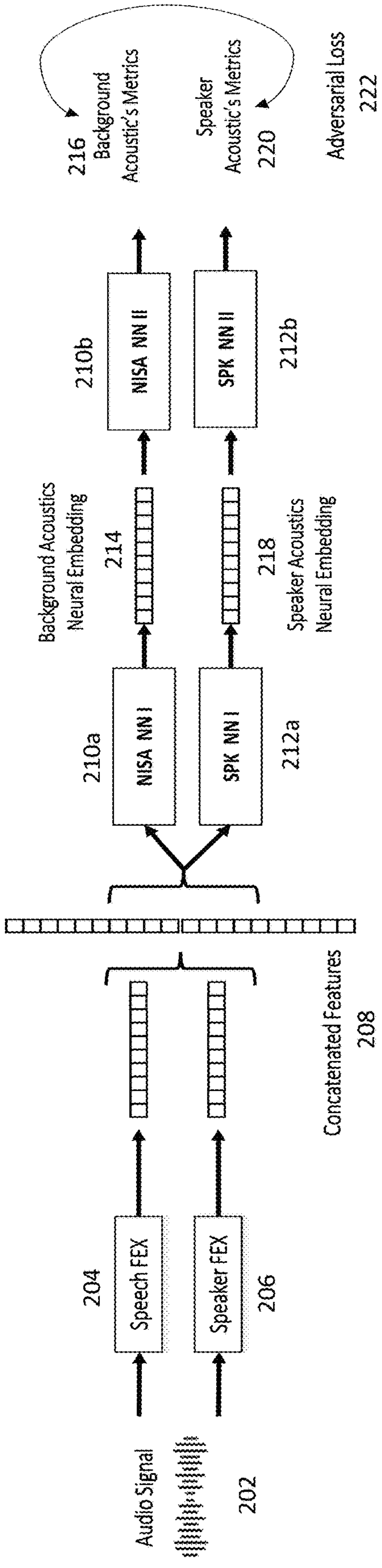
FIG. 2 is a diagrammatic view of an implementation of the speech signal disentanglement process.

Referring to FIGS. 1-6, implementations of the present disclosure are directed to disentangling information in audio signals to enhance the operation of speech processing systems such as Text-to-Speech (TTS) and Voice Style Transfer (VST) systems. FIG. 1 is a flow chart 100 of one implementation of an audio signal disentanglement process and FIG. 2 is a diagrammatic view of an implementation 200 of the audio signal disentanglement process of the present disclosure. In the implementation, an audio speech signal 202 is received 102 by a speech processing system 200. Audio speech signal 202 contains features related to background noise, including reverberation-related information (C50, T60, DRR, C5, etc.), noise-related information (noise type, signal-to-noise ratio (SNR), etc.), voice-related information (voice activity detection (VAD), overlapped speech detection, etc.), signal quality information (PESQ, STOI, etc.), and CODEC type and bit rate. Audio speech signal 202 also contains features related to the speech/speaker, including pitch and pitch variation, vocal tract length estimate, and features such as gender, accent, region, language, age, etc. Since these features are physical/physiological parameters that can be measured and recognized, they are referred to as "explainable." This is opposed to non-explainable features of the signal, which are mathematical formulations that characterize certain aspects of the signal, but are not physical or measurable.

The speech/background component of signal 202 is processed 104 in a first branch 204 to extract the background feature information. In an implementation of the present disclosure, the speech feature extraction is performed based on Mel filterbank coefficients, however, other forms of feature extraction may be utilized to obtain the described results. The speaker component of signal 202 is processed in a second branch 206 to extract the speaker feature information. In an implementation of the present disclosure, the speaker feature extraction is performed based on ECAPA-TDNN speaker embeddings, however, other forms of feature extraction may be utilized to obtain the described results.

Once extracted, the features are concatenated 105, resulting in a concatenation of features 208. Concatenated features refer to a technique where multiple types of acoustic features are combined or concatenated to create a more comprehensive representation of the input audio signal. The goal is to further refine different features of the acoustic information in order to improve the accuracy of speech recognition systems. ASR systems typically rely on various types of features extracted from the input audio signal to represent its characteristics. Concatenated features combine the representations from different feature types to create a more informative feature vector for each frame or time segment of the input audio. The concatenated feature vector can then be used as input to the ASR system. Using concatenated features is advantageous for a number of reasons.

Different types of features capture different aspects of speech information, so concatenating them can provide a more comprehensive representation of the acoustic characteristics of speech. Further, by combining multiple feature types, the ASR system may become more robust to variations in speakers, environments, and background noise. Also, the combination of diverse features can enhance the discriminative power of the ASR system, potentially leading to better recognition accuracy.

The concatenated features are then processed in neural network sub-paths to generate neural embeddings 106. Embeddings are representations of acoustic or linguistic features that capture the characteristics of speech signals. Embeddings play a crucial role in converting raw audio signals into a form more suitable for machine learning models to process and make predictions. Acoustic embeddings capture the acoustic characteristics of speech signals and are used to convert audio signals into a fixed-size vector representation. Neural network components 210*a* and 210*b* process the concatenated features 208 using machine learning to generate Background acoustics neural embeddings 214 in a layer between neural networks 210*a* and 210*b*, 108, and Background acoustics metrics 216, respectively. Neural network components 212*a* and 212*b* process the concatenated features 208 using machine learning to generate Speaker acoustics neural embeddings 218 in a layer between neural networks 212*a* and 212*b*, 110, and Speaker acoustics metrics 220, respectively.

As is described in greater detail below, Background acoustics metrics 216 and Speaker acoustic metrics 220 are utilized as an adversarial loss factor 222 in the training of the system 200. In a non-supervised process, the Background acoustics metrics 216 and Speaker acoustics metrics 220 are utilized within neural networks 210*a*, 114, and 212*a*, 120 as adversarial loss factor 222. When processing the concatenated features in neural network 210*a* to generate the Background acoustics neural embedding 214, a loss of Background acoustics metrics 216 is minimized 116 while a loss of Speaker acoustics metrics 220 is maximized 118. This causes the neural network 210*a* to favor learning the Background features and to disfavor learning the Speaker features. Likewise, when processing the concatenated features in neural network 212*a* to generate the Speaker acoustics neural embedding 216, a loss of Speaker acoustics metrics 220 is minimized 122 while a loss of Background acoustics metrics 216 is maximized 124. This causes the neural network 212*a* to favor learning the Speaker features and to disfavor learning the Background features.

Based on the described process, the outputs from the neural networks 210*a* and 210*b*, i.e., the Background acoustics neural embedding 214 and the Speaker acoustics neural embedding 218 are "disentangled" in that the presence of speaker information in the Background acoustics neural embedding 214 is decreased while the Background information is increased and the Background information in the speaker acoustic neural embedding 218 is decreased while the Speaker information is increased. Each iteration during a training process fortified this trend 112.

As described above, examples of Background acoustic metrics include reverberation-related information (C50, T60, DRR, C5, etc.), noise-related information (noise type, signal-to-noise ratio (SNR), etc.), voice-related information (voice activity detection (VAD), overlapped speech detection, etc.), signal quality information (PESQ, STOI, etc.), and CODEC type and bit rate. Examples of Speaker acoustic metrics include features related to the speech/speaker, including pitch and pitch variation, vocal tract length estimate, and features such as gender, accent, region, language, age, etc.

Figure 3:
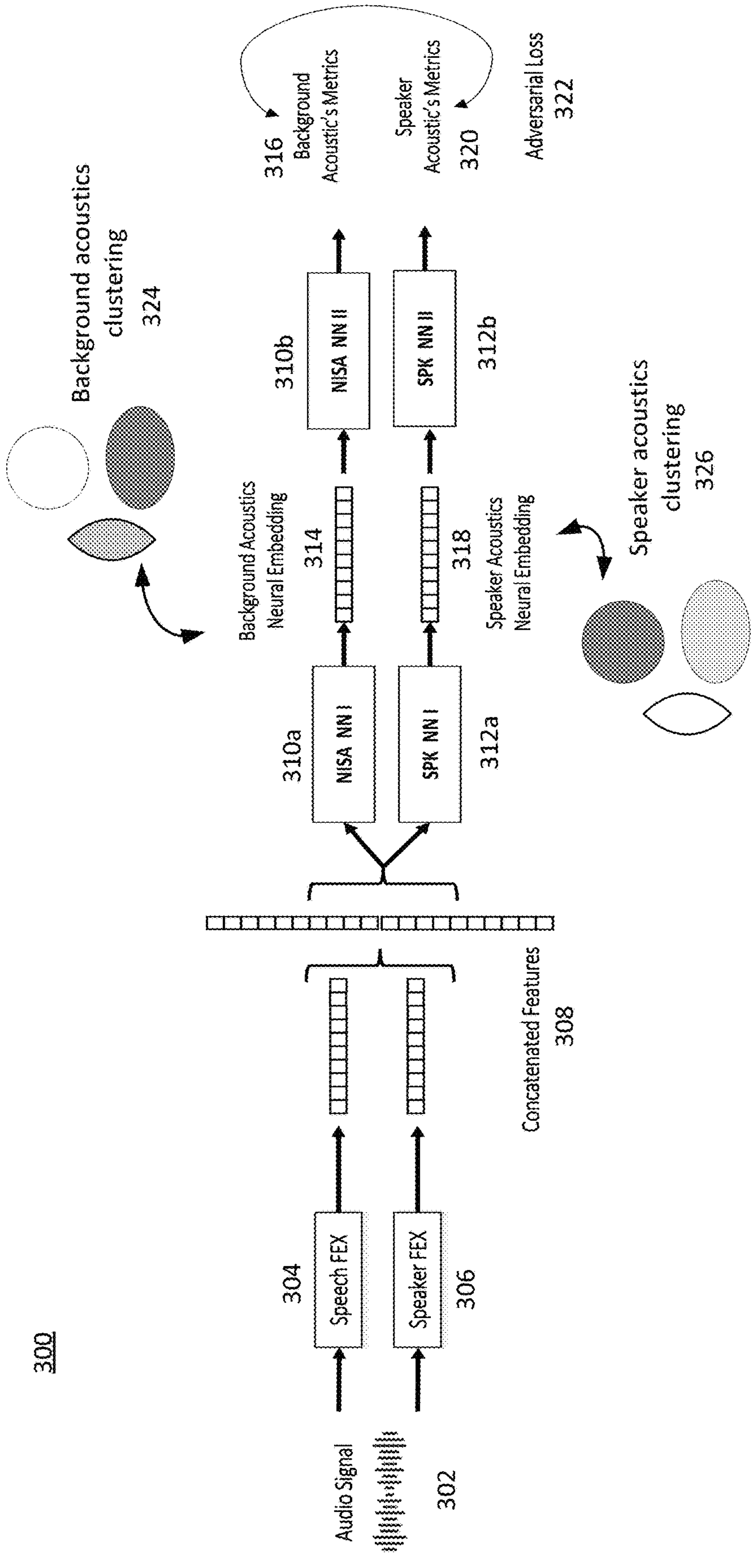
FIG. 3 is a diagrammatic view of another implementation of the speech signal disentanglement process.

FIG. 3 is a diagrammatic view of a further implementation 300 of the audio signal disentanglement process of the present disclosure. In the implementation, an audio speech signal 302 is received 102 by a speech processing system 300. Audio speech signal 302 contains features related to background noise, including reverberation-related information (C50, T60, DRR, C5, etc.), noise-related information (noise type, signal-to-noise ratio (SNR), etc.), voice-related information (voice activity detection (VAD), overlapped speech detection, etc.), signal quality information (PESQ, STOI, etc.), and CODEC type and bit rate. Audio speech signal 302 also contains features related to the speech/speaker, including pitch and pitch variation, vocal tract length estimate, and features such as gender, accent, region, language, age, etc. Since these features are physical/physiological parameters that can be measured and recognized, they are referred to as "explainable." This is opposed to non-explainable features of the signal, which are mathematical formulations that characterize certain aspects of the signal, but are not physical or measurable. In some implementations, these non-explainable features are formulated as the output of a clustering algorithm, where embeddings belonging to speech from the same speaker are grouped "closer" together than speech from other speakers, for example.

The speech/background component of signal 302 is processed 104 in a first branch 304 to extract the background feature information. In an implementation of the present disclosure, the speech feature extraction is performed based on Mel filterbank coefficients, however, other forms of feature extraction may be utilized to obtain the described results. The speaker component of signal 302 is processed in a second branch 306 to extract the speaker feature information. In an implementation of the present disclosure, the speaker feature extraction is performed based on ECAPA- TDNN speaker embeddings, however, other forms of feature extraction may be utilized to obtain the described results.

Once extracted, the features are concatenated 105, resulting in a concatenation of features 308. The concatenated features are then processed in neural network sub-paths to generate neural embeddings 106. Embeddings are representations of acoustic or linguistic features that capture the characteristics of speech signals. Embeddings play a crucial role in converting raw audio signals into a form suitable for machine learning models to process and make predictions. Acoustic embeddings capture the acoustic characteristics of speech signals and are used to convert audio signals into a fixed-size vector representation. Neural network components 310*a* and 310*b* process the concatenated features 308 to generate Background acoustics neural embeddings 314 in a layer between neural networks 310*a* and 310*b*, 108, and Background acoustics metrics 316, respectively. Neural network components 312*a* and 312*b* process the concatenated features 308 to generate Speaker acoustics neural embeddings 318 in a layer between neural networks 312*a* and 312*b*, 110, and Speaker acoustics metrics 320, respectively.

As is described in greater detail below, Background acoustics metrics 316 and Speaker acoustic metrics 320 are utilized as an adversarial loss factor 322 in the training of the system 300. In a semi-supervised process, the Background acoustics metrics 316 and Speaker acoustics metrics 320 are utilized within neural networks 310*a*, 114, and 312*a*, 120 as adversarial loss factor 322. When processing the concatenated features in neural network 310*a* to generate the Background acoustics neural embedding 314, a loss of Background acoustics metrics 316 is minimized 116 while a loss of Speaker acoustics metrics 320 is maximized 118. This causes the neural network 310*a* to favor learning the Background features and to disfavor learning the Speaker features. Likewise, when processing the concatenated features in neural network 312*a* to generate the Speaker acoustics neural embedding 316, a loss of Speaker acoustics metrics 320 is minimized 122 while a loss of Background acoustics metrics 316 is maximized 124. This causes the neural network 312*a* to favor learning the Speaker features and to disfavor learning the Background features.

Based on the described process, the outputs from the neural networks 310*a*, 310*b*, 312*a*, and 312*b*, i.e., the Background acoustics metrics 316 and the Speaker acoustics metrics 320 are "disentangled" in that the presence of speaker information in the Background acoustics metrics 316 is decreased while the Background information is increased and the Background information in the speaker acoustic metrics 320 is decreased while the Speaker information is increased. Each iteration during a training process 112 fortifies this trend.

In this implementation of the disclosure, the Background acoustics neural embedding 314 and speaker acoustics neural embedding 318 can be subjected to additional clustering constraints. In such an instance, the Background acoustics-based clusters 324 group the embeddings by, for example, noise type, reverberation amount, and bit rate, among other metrics. Speaker acoustics-based clusters 326 group embeddings into speaker identities or physiological-based clusters, such as pitch, gender, etc. By additionally clustering the embeddings into predefined classes, the system can be trained using these more defined and consistent embeddings.

Figure 4:
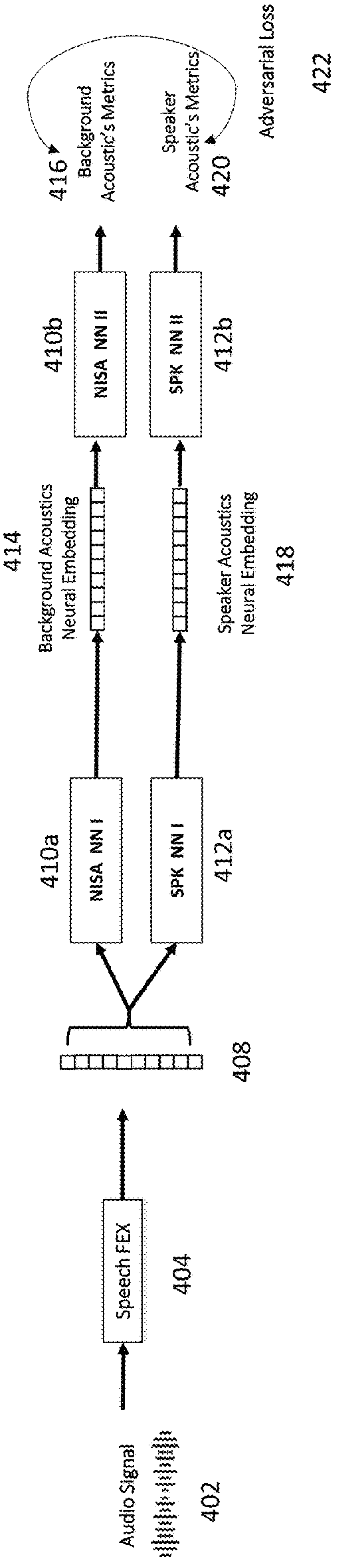
FIG. 4 is a diagrammatic view of yet another implementation of the speech signal disentanglement process.

FIG. 4 is a diagrammatic view of a further implementation 400 of the audio signal disentanglement process of the present disclosure. In the implementation, an audio speech signal 402 is received 102 by a speech processing system 400. Audio speech signal 402 only contains features related to the speech/speaker, including pitch and pitch variation, vocal tract length estimate, and features such as gender, accent, region, language, age, etc. Since these features are physical/physiological parameters that can be measured and recognized, they are referred to as "explainable." This is opposed to non-explainable features of the signal, which are mathematical formulations that characterize certain aspects of the signal, but are not physical or measurable. The speech input can be from a pre-learnt neural feature extraction system, such as, for example, SPIRAL or WavLM.

The speech/background component of signal 402 is processed 104 in branch 404 to extract the background feature information. In an implementation of the present disclosure, the speech feature extraction is performed based on Mel filterbank coefficients, however, other forms of feature extraction may be utilized to obtain the described results.

Once extracted, the features are concatenated 105, resulting in a concatenation of features 408. The concatenated features are then processed in neural network sub-paths to generate neural embeddings 106. Embeddings are representations of acoustic or linguistic features that capture the characteristics of speech signals. Embeddings play a crucial role in converting raw audio signals into a form suitable for machine learning models to process and make predictions. Acoustic embeddings capture the acoustic characteristics of speech signals and are used to convert audio signals into a fixed-size vector representation. Neural network components 410*a* and 410*b* process the concatenated features 408 to generate Background acoustics neural embeddings 414 in a layer between neural networks 410*a* and 410*b*, 108, and Background acoustics metrics 416, respectively. Neural network components 412*a* and 412*b* process the concatenated features 408 to generate Speaker acoustics neural embeddings 418 in a layer between neural networks 412*a* and 412*b*, 110, and Speaker acoustics metrics 420, respectively.

As is described in greater detail below, Background acoustics metrics 416 and Speaker acoustic metrics 420 are utilized as an adversarial loss factor 422 in the training of the system 400. In a semi-supervised process, the Background acoustics metrics 416 and Speaker acoustics metrics 420 are utilized within neural networks 410*a*, 114, and 412*a*, 120 as adversarial loss factor 422. When processing the concatenated features in neural network 410*a* to generate the Background acoustics neural embedding 414, a loss of Background acoustics metrics 416 is minimized 116 while a loss of Speaker acoustics metrics 420 is maximized 118. This causes the neural network 410*a* to favor learning the Background features and to disfavor learning the Speaker features. Likewise, when processing the concatenated features in neural network 412*a* to generate the Speaker acoustics neural embedding 416, a loss of Speaker acoustics metrics 420 is minimized 122 while a loss of Background acoustics metrics 416 is maximized 124. This causes the neural network 412*a* to favor learning the Speaker features and to disfavor learning the Background features.

Based on the described process, the outputs from the neural networks 410*a*, 410*b*, 412*a*, and 412*b*, i.e., the Background acoustics metrics 416 and the Speaker acoustics metrics 420 are "disentangled" in that the presence of speaker information in the Background acoustics metrics 416 is decreased while the Background information is increased and the Background information in the speaker acoustic metrics 420 is decreased while the Speaker information is increased. Each iteration during a training process 112 fortifies this trend.

Figure 5:
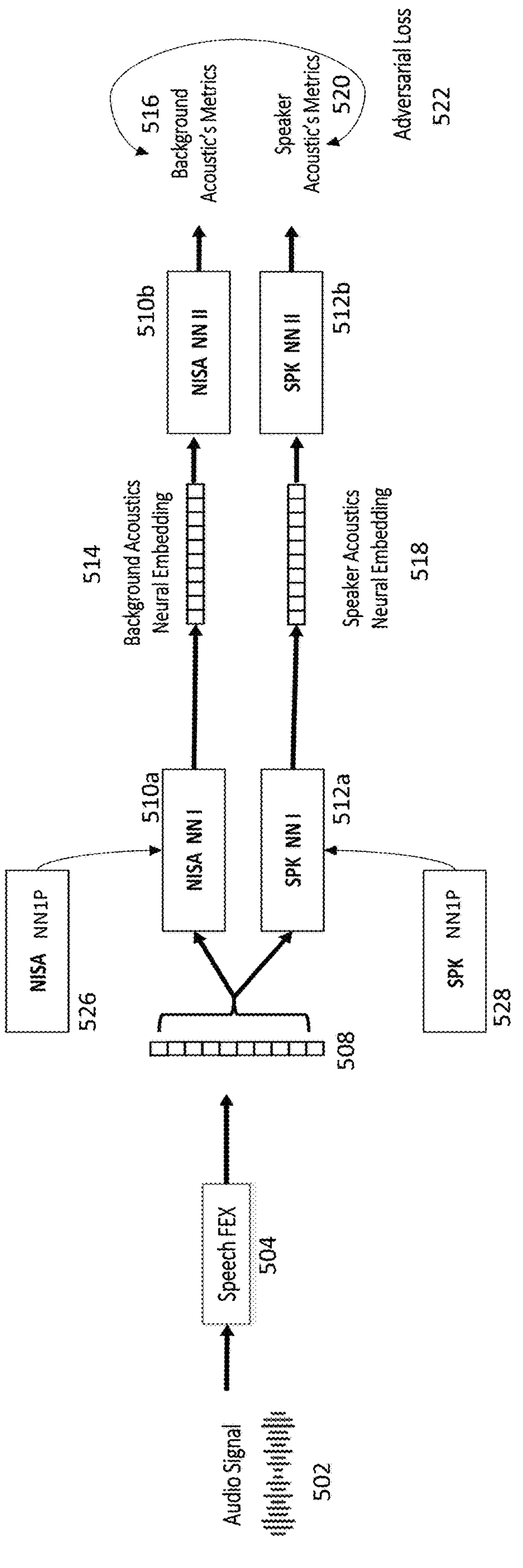
FIG. 5 is a diagrammatic view of yet another implementation of the speech signal disentanglement process.

FIG. 5 is a diagrammatic view of a further implementation 500 of the audio signal disentanglement process of the present disclosure. In the implementation, an audio speech signal 502 is received 102 by a speech processing system 400. Audio speech signal 502 only contains features related to the speech/speaker, including pitch and pitch variation, vocal tract length estimate, and features such as gender, accent, region, language, age, etc. Since these features are physical/physiological parameters that can be measured and recognized, they are referred to as "explainable." This is opposed to non-explainable features of the signal, which are mathematical formulations that characterize certain aspects of the signal, but are not physical or measurable. The speech input can be from a pre-learnt neural feature extraction system, such as, for example, SPIRAL or WavLM.

The speech/background component of signal 502 is processed 104 in branch 504 to extract the background feature information. In an implementation of the present disclosure, the speech feature extraction is performed based on Mel filterbank coefficients, however, other forms of feature extraction may be utilized to obtain the described results.

Once extracted, the features are concatenated 105, resulting in a concatenation of features 508. The concatenated features are then processed in neural network sub-paths to generate neural embeddings 106. Embeddings are representations of acoustic or linguistic features that capture the characteristics of speech signals. Embeddings play a crucial role in converting raw audio signals into a form suitable for machine learning models to process and make predictions. Acoustic embeddings capture the acoustic characteristics of speech signals and are used to convert audio signals into a fixed-size vector representation. Neural network components 510*a* and 510*b* process the concatenated features 508 to generate Background acoustics neural embeddings 514 in a layer between neural networks 510*a* and 510*b*, 108, and Background acoustics metrics 516, respectively. Neural network components 512*a* and 512*b* process the concatenated features 408 to generate Speaker acoustics neural embeddings 418 in a layer between neural networks 512*a* and 512*b*, 110, and Speaker acoustics metrics 520, respectively.

As is described in greater detail below, Background acoustics metrics 516 and Speaker acoustic metrics 520 are utilized as an adversarial loss factor 522 in the training of the system 500. In a semi-supervised process, the Background acoustics metrics 516 and Speaker acoustics metrics 520 are utilized within neural networks 510*a*, 114, and 512*a*, 120 as adversarial loss factor 522. When processing the concatenated features in neural network 510*a* to generate the Background acoustics neural embedding 514, a loss of Background acoustics metrics 516 is minimized 116 while a loss of Speaker acoustics metrics 520 is maximized 118. This causes the neural network 510*a* to favor learning the Background features and to disfavor learning the Speaker features. Likewise, when processing the concatenated features in neural network 512*a* to generate the Speaker acoustics neural embedding 416, a loss of Speaker acoustics metrics 420 is minimized 122 while a loss of Background acoustics metrics 516 is maximized 124. This causes the neural network 512*a* to favor learning the Speaker features and to disfavor learning the Background features.

Based on the described process, the outputs from the neural networks 510*a*, 510*b*, 512*a*, and 512*b*, i.e., the Background acoustics metrics 516 and the Speaker acoustics metrics 520 are "disentangled" in that the presence of speaker information in the Background acoustics metrics 516 is decreased while the Background information is increased and the Background information in the speaker acoustic metrics 520 is decreased while the Speaker information is increased. Each iteration during a training process 112 fortifies this trend.

In this implementation, Background neural network 510*a* and Speaker neural network 512*a* are initialized with pre-trained networks 526 and 528, respectively, which causes the training process of system 500 to be more efficient.

Figure 6:
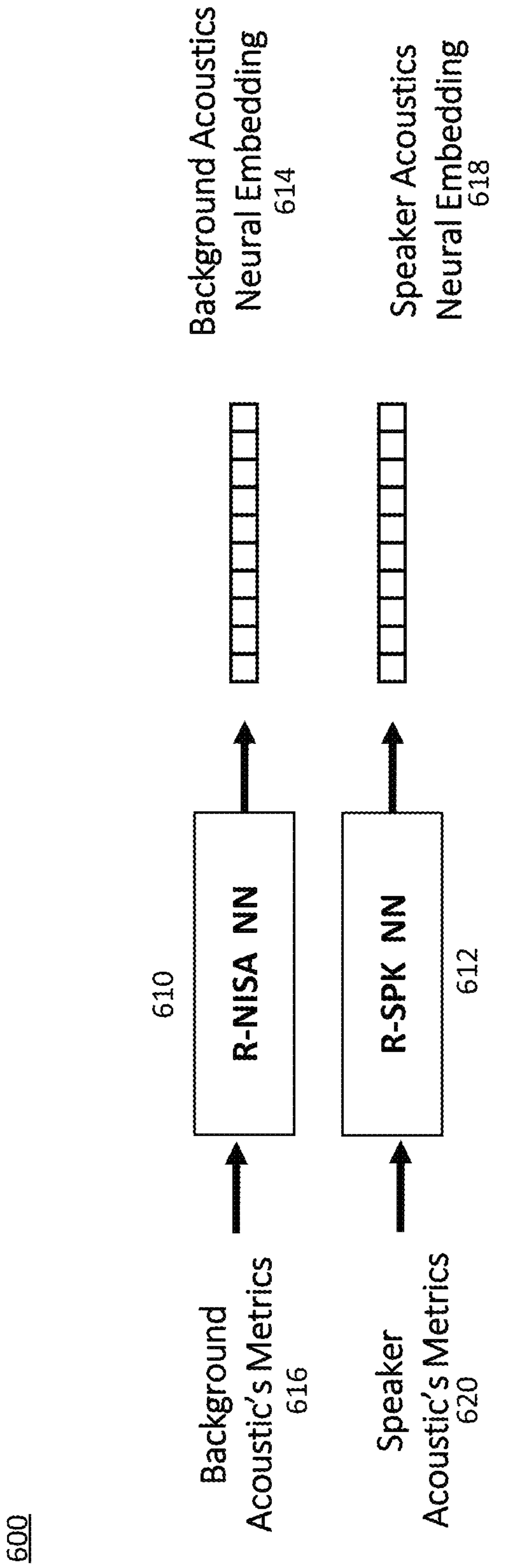
FIG. 6 is a diagrammatic view of yet another implementation of the speech signal disentanglement process.

FIG. 6 is a diagrammatic view of a further implementation 600 of the audio signal disentanglement process of the present disclosure. In the implementation, a reverse neural network is trained that allows the Background acoustics neural embeddings 614 and the Speaker acoustics neural embeddings 616 to be estimated based on Background acoustics metrics 616 and Speaker acoustics metrics 620. As shown, Background acoustics metrics 616 and Speaker acoustics metrics 620 are input into reverse Background neural network 610 and reverse speaker neural network 612, respectively, which estimates an average of the Background acoustics neural embeddings 614 and the Speaker acoustics neural embeddings 614. Such an operation enables more systematic control of voice and background acoustics in a TTS/VST system, as this can allow the user to synthesize data given a set of background acoustic metrics or speaker acoustic metrics.

As discussed above, implementations of the present disclosure are directed to processing audio signals to enhance the operation of speech processing systems such as Text-to-Speech (TTS) and Voice Style Transfer (VST) systems. By disentangling the background and speaker information from each other, each component of the speech signal is able to be manipulated independently of the other.

Figure 7:
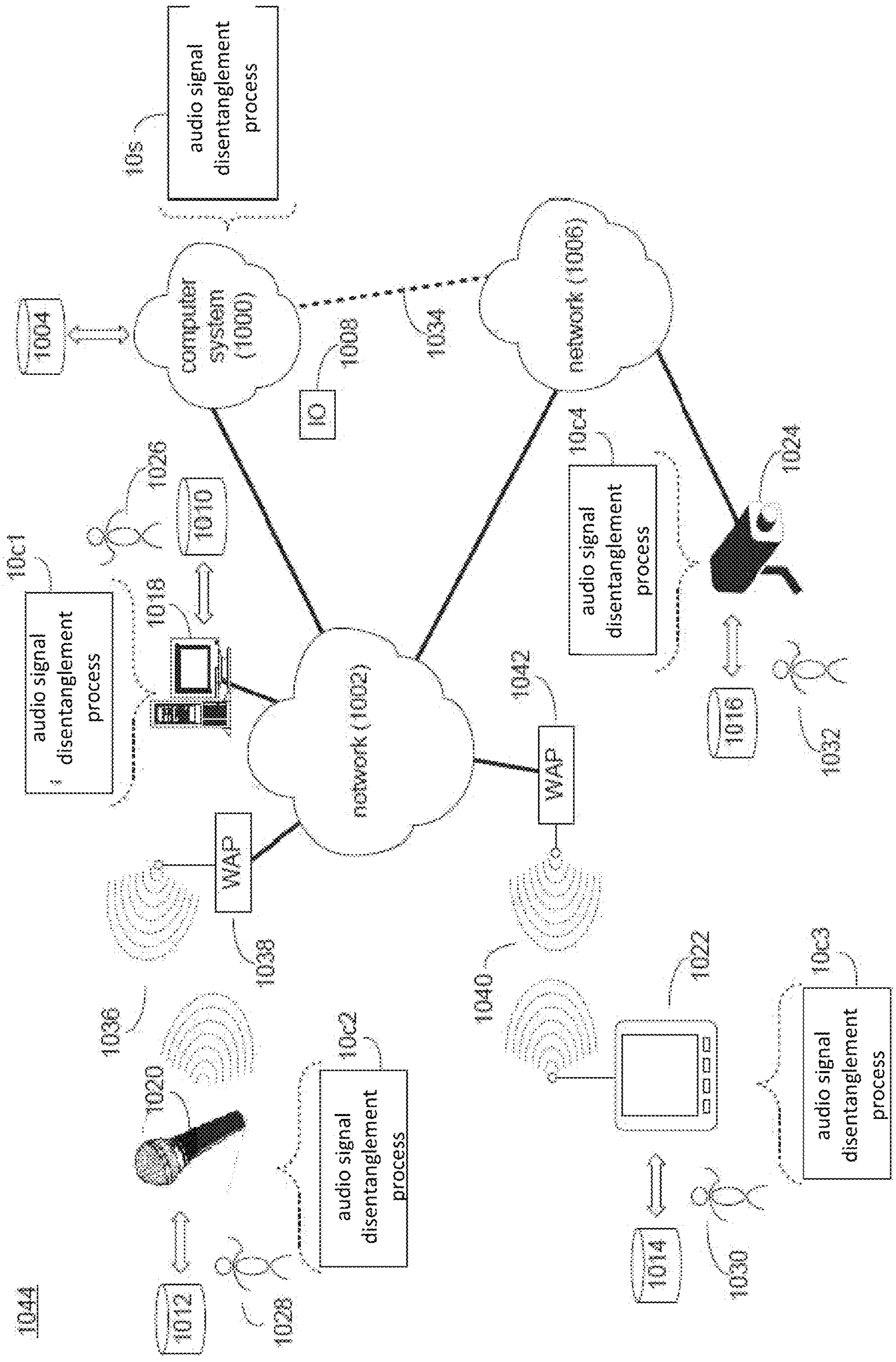
FIG. 7 is a diagrammatic view of a computer system and the speech signal disentanglement process coupled to a distributed computing network.

System Overview:

Referring to FIG. 7, there is shown an audio signal disentanglement process 10. Audio signal disentanglement process 10 may be implemented as a server-side process, a client-side process, or a hybrid server-side/client-side process. For example, audio signal disentanglement process 10 may be implemented as a purely server-side process via computational cost reduction process 10*s*. Alternatively, audio signal disentanglement process 10 may be implemented as a purely client-side process via one or more of audio signal disentanglement process 10*c*1, audio signal disentanglement process 10*c*2, audio signal disentanglement process 10*c*3, and audio signal disentanglement process 10*c*4. Alternatively still, audio signal disentanglement process 10 may be implemented as a hybrid server-side/client-side process via audio signal disentanglement process 10*s* in combination with one or more of audio signal disentanglement process 10*c*1, audio signal disentanglement process 10*c*2, audio signal disentanglement process 10*c*3, and audio signal disentanglement process 10*c*4.

Accordingly, audio signal disentanglement process 10 as used in this disclosure may include any combination of audio signal disentanglement process 10*s*, audio signal disentanglement process 10*c*1, audio signal disentanglement process 10*c*2, audio signal disentanglement process 10*c*3, and audio signal disentanglement process 10*c*4.

Audio signal disentanglement process 10*s* may be a server application and may reside on and may be executed by a computer system 1000, which may be connected to network 1002 (e.g., the Internet or a local area network). Computer system 1000 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device and a NAS system. The various components of computer system 1000 may execute one or more operating systems.

The instruction sets and subroutines of computational cost reduction process 10*s*, which may be stored on storage device 1004 coupled to computer system 1000, may be executed by one or more processors (not shown) and one or more memory architectures (not shown) included within computer system 1000. Examples of storage device 1004 may include but are not limited to: a hard disk drive; a RAID device; a random-access memory (RAM); a read-only memory (ROM); and all forms of flash memory storage devices.

Network 1002 may be connected to one or more secondary networks (e.g., network 1006), examples of which may include but are not limited to: a local area network; a wide area network; or an intranet, for example.

Various IO requests (e.g., IO request 1008) may be sent from audio signal disentanglement process 10*s*, audio signal disentanglement process 10*c*1, audio signal disentanglement process 10*c*2, audio signal disentanglement process 10*c*3 and/or audio signal disentanglement process 10*c*4 to computer system 1000. Examples of IO request 1008 may include but are not limited to data write requests (i.e., a request that content be written to computer system 1000) and data read requests (i.e., a request that content be read from computer system 1000).

The instruction sets and subroutines of audio signal disentanglement process 10*c*1, audio signal disentanglement process 10*c*2, audio signal disentanglement process 10*c*3 and/or computational cost reduction process 10*c*4, which may be stored on storage devices 1010, 1012, 1014, 1016 (respectively) coupled to client electronic devices 1018, 1020, 1022, 1024 (respectively), may be executed by one or more processors (not shown) and one or more memory architectures (not shown) incorporated into client electronic devices 1018, 1020, 1022, 1024 (respectively). Storage devices 1010, 1012, 1014, 1016 may include but are not limited to: hard disk drives; optical drives; RAID devices; random access memories (RAM); read-only memories (ROM), and all forms of flash memory storage devices. Examples of client electronic devices 1018, 1020, 1022, 1024 may include, but are not limited to, personal computing device 1018 (e.g., a smart phone, a personal digital assistant, a laptop computer, a notebook computer, and a desktop computer), audio input device 1020 (e.g., a handheld microphone, a lapel microphone, an embedded microphone (such as those embedded within eyeglasses, smart phones, tablet computers and/or watches) and an audio recording device), display device 1022 (e.g., a tablet computer, a computer monitor, and a smart television), a hybrid device (e.g., a single device that includes the functionality of one or more of the above-references devices; not shown), an audio rendering device (e.g., a speaker system, a headphone system, or an earbud system; not shown), and a dedicated network device (not shown).

Users 1026, 1028, 1030, 1032 may access computer system 1000 directly through network 1002 or through secondary network 1006. Further, computer system 1000 may be connected to network 1002 through secondary network 1006, as illustrated with link line 1034.

The various client electronic devices (e.g., client electronic devices 1018, 1020, 1022, 1024) may be directly or indirectly coupled to network 1002 (or network 1006). For example, personal computing device 1018 is shown directly coupled to network 1002 via a hardwired network connection. Further, machine vision input device 1024 is shown directly coupled to network 1006 via a hardwired network connection. Audio input device 1020 is shown wirelessly coupled to network 1002 via wireless communication channel 1036 established between audio input device 1020 and wireless access point (i.e., WAP) 1038, which is shown directly coupled to network 1002. WAP 1038 may be, for example, an IEEE 802.11a, 802.11b, 802.11 g, 802.11n, Wi-Fi, and/or any device that is capable of establishing wireless communication channel 1036 between audio input device 1020 and WAP 1038. Display device 1022 is shown wirelessly coupled to network 1002 via wireless communication channel 1040 established between display device 1022 and WAP 1042, which is shown directly coupled to network 1002.

The various client electronic devices (e.g., client electronic devices 1018, 1020, 1022, 1024) may each execute an operating system, wherein the combination of the various client electronic devices (e.g., client electronic devices 1018, 1020, 1022, 1024) and computer system 1000 may form modular system 1044.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method comprising:

receiving a speech signal recorded in an acoustic environment;

extracting background information from the speech signal to generate a background acoustics embedding;

extracting speaker information from the speech signal to generate a speaker acoustics embedding;

iteratively training a speech processing system that includes a Non-Intrusive Speech Assessment (NISA) neural network and an SPK neural network; to process the background acoustics embedding and the speaker acoustics embedding in parallel over multiple training iterations by:

inputting the background acoustics embedding to the NISA neural network to produce a processed background acoustics embedding by applying a first adversarial loss that is based on background acoustic metrics and inversely related to speaker acoustic metrics, such that speaker information in the processed background acoustics embedding is reduced across the training iterations; and inputting the speaker acoustics embedding to the SPK neural network to produce a processed speaker acoustics embedding by applying a second adversarial loss that is based on speaker acoustic metrics and inversely related to background acoustic metrics, such that background information in the processed speaker acoustics embedding is reduced across the training iterations; and after completion of the iterative training, performing speech recognition on speech signals recorded in the acoustic environment using the trained speech processing system.

2. The method of claim 1, further including combining features of the background information and the speaker information prior to generating the background acoustics embedding and the speaker acoustics embedding.

3. The method of claim 1, wherein the processed background acoustics embedding and the processed speaker acoustics embedding are used to train the speech processing system.

4. The method of claim 1, further including applying a clustering constraint in the generation of at least one of the background acoustics embedding and the speaker acoustics embedding.

5. The method of claim 1, wherein the background acoustic metrics include reverberation parameters associated with the acoustic environment.

6. The method of claim 5, wherein the reverberation parameters include at least one of C50, T60, DRR, or C5 parameters.

7. The method of claim 1, wherein the background acoustic metrics indicate a noise type and a signal-to-noise ratio (SNR).

8. The method of claim 1, wherein the background acoustic metrics include voice activity detection parameters or voice overlap detection parameters.

9. The method of claim 1, wherein the background acoustic metrics include signal quality parameters comprising at least one of an PESQ parameter or an STOI parameter.

10. The method of claim 1, wherein the background acoustic metrics indicate a CODEC type.

11. The method of claim 1, wherein the background acoustic metrics indicate a CODEC bit rate.

12. The method of claim 1, wherein the speaker acoustic metrics indicate a pitch of a speaker.

13. The method of claim 1, wherein the speaker acoustic metrics indicate a pitch variation of a speaker.

14. The method of claim 1, wherein the speaker acoustic metrics indicate a vocal tract length of a speaker.

15. The method of claim 1, wherein the speaker acoustic metrics indicate a gender of a speaker.

16. The method of claim 1, wherein the speaker acoustic metrics indicate an accent of a speaker.

17. The method of claim 1, wherein the speaker acoustic metrics indicate a language of a speaker.

18. The method of claim 1, wherein the speaker acoustic metrics indicate an age of a speaker.

19. A system comprising:

at least one processor; and a memory storing programming instructions for the at least one processor, the programming instructions, upon execution by the at least one processor, causing the system to perform the following operations:

receiving a speech signal recorded in an acoustic environment;

extracting background information from the speech signal to generate a background acoustics embedding;

extracting speaker information from the speech signal to generate a speaker acoustics embedding;

iteratively training a speech processing system that includes a Non-Intrusive Speech Assessment (NISA) neural network and an SPK neural network; to process the background acoustics embedding and the speaker acoustics embedding in parallel over multiple training iterations by:

inputting the background acoustics embedding to the NISA neural network to produce a processed background acoustics embedding by applying a first adversarial loss that is based on background acoustic metrics and inversely related to speaker acoustic metrics, such that speaker information in the processed background acoustics embedding is reduced across the training iterations; and inputting the speaker acoustics embedding to the SPK neural network to produce a processed speaker acoustics embedding by applying a second adversarial loss that is based on speaker acoustic metrics and inversely related to background acoustic metrics, such that background information in the processed speaker acoustics embedding is reduced across the training iterations; and after completion of the iterative training, performing speech recognition on speech signals recorded in the acoustic environment using the trained speech processing system.

20. A computer program product residing on a non-transitory computer readable medium having programming instructions stored thereon which, when executed by a processor of a system, cause the system to perform the following operations:

receiving a speech signal recorded in an acoustic environment;

extracting background information from the speech signal to generate a background acoustics embedding;

extracting speaker information from the speech signal to generate a speaker acoustics embedding;

iteratively training a speech processing system that includes a Non-Intrusive Speech Assessment (NISA) neural network and an SPK neural network; to process the background acoustics embedding and the speaker acoustics embedding in parallel over multiple training iterations by:

inputting the background acoustics embedding to the NISA neural network to produce a processed background acoustics embedding by applying a first adversarial loss that is based on background acoustic metrics and inversely related to speaker acoustic metrics, such that speaker information in the processed background acoustics embedding is reduced across the training iterations; and inputting the speaker acoustics embedding to the SPK neural network to produce a processed speaker acoustics embedding by applying a second adversarial loss that is based on speaker acoustic metrics and inversely related to background acoustic metrics, such that background information in the processed speaker acoustics embedding is reduced across the training iterations; and after completion of the iterative training, performing speech recognition on speech signals recorded in the acoustic environment using the trained speech processing system.

* * * * *